US012338110B2

(12) United States Patent
Martin, Jr.

(10) Patent No.: US 12,338,110 B2
(45) Date of Patent: Jun. 24, 2025

(54) TRUCK WHEEL LIFTING CART

(71) Applicant: Juan Martin, Jr., Tipton, CA (US)

(72) Inventor: Juan Martin, Jr., Tipton, CA (US)

( * ) Notice: Subject to any disclaimer, the term of this patent is extended or adjusted under 35 U.S.C. 154(b) by 372 days.

(21) Appl. No.: 17/984,873

(22) Filed: Nov. 10, 2022

(65) Prior Publication Data

US 2024/0158214 A1 May 16, 2024

(51) Int. Cl.
*B66F 5/04* (2006.01)

(52) U.S. Cl.
CPC ..................................... *B66F 5/04* (2013.01)

(58) Field of Classification Search
CPC .......... B60B 30/02; B60B 29/002; B66F 5/04
See application file for complete search history.

(56) References Cited

U.S. PATENT DOCUMENTS 2,326,684 A * 8/1943 Ross ......................... B66F 5/04 414/427
2,477,858 A 8/1949 Brabbin
4,401,405 A * 8/1983 Ealet ......................... B66F 9/18 414/428
4,571,142 A * 2/1986 Niewald ................. B66F 19/00 414/427
D357,106 S 4/1995 Francis
7,334,804 B2 2/2008 Mitchell
9,302,543 B1 * 4/2016 Pierce ..................... B60B 30/02
10,035,688 B1 * 7/2018 Robinson .................. B66F 5/00
2006/0151248 A1 7/2006 Rodriguez
2014/0050554 A1 * 2/2014 Soto ........................ B60B 30/02 414/800
2015/0290972 A1 * 10/2015 Minor ................... B60B 29/001 254/4 B
2016/0325586 A1 * 11/2016 Mathieson ............ B60B 29/002
2017/0232793 A1 * 8/2017 Ang ........................... B66F 5/04 414/426
2018/0170728 A1 6/2018 Chen
2020/0269641 A1 8/2020 Edwards, Sr.
2020/0290399 A1 * 9/2020 James ....................... B66F 7/08

FOREIGN PATENT DOCUMENTS

WO WO2014169750 10/2014

* cited by examiner

*Primary Examiner* — Seahee Hong

(57) ABSTRACT

A truck wheel lifting cart for movably supporting a truck wheel such that the truck wheel is movable between a lowered position and a raised position includes a wheeled base member and a saddle which is coupled to the base member via a linkage that permits the saddle to move upwardly and forwardly from a lowered position to a raised position such that the saddle is retained in a constant orientation between the lowered position and the raised position. The saddle is configured for supporting a truck wheel, aligning a central axis of the truck wheel in a horizontal orientation, and permitting rotation of the truck wheel about the central axis. A lifter assembly moves the saddle between the lowered position and the raised position.

8 Claims, 6 Drawing Sheets

TRUCK WHEEL LIFTING CART

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to truck wheel lifting carts and more particularly pertains to a new truck wheel lifting cart for movably supporting a truck wheel such that the truck wheel is movable between a lowered position and a raised position.

(2) Description of Related Art Including Information Disclosed Under 37 CFR 1.97 and 1.98

The prior art relates to truck wheel lifting carts which support a truck wheel and are capable of moving a truck wheel vertically while permitting the truck wheel to be rotated about a central axis of the truck wheel.

BRIEF SUMMARY OF THE INVENTION

An embodiment of the disclosure meets the needs presented above by generally comprising a base member with a plurality of base wheels is coupled to and extends downwardly from the base member. The plurality of wheels is configured for positioning on a support surface and facilitating movement of the base member across the support surface. A saddle member is attached to the base member such that the saddle member is movable between a lowered position and a raised position. The saddle member is retained in a constant orientation relative to the base member when the saddle member is moved between the lowered position and the raised position. The saddle member is positioned adjacently above the base member when in the lowered position and is moved upwardly from the base member when the saddle member is moved from the lowered position toward the raised position. The saddle member is configured for supporting a truck wheel thereon, aligning a central axis of the truck wheel in a horizontal orientation, and permitting rotation of the truck wheel about the central axis.

A linkage is coupled to and extends between the base member and the saddle member which permits the saddle member to move upwardly and forwardly of the base member when the saddle member is moved from the lowered position to the raised position such that the saddle member is retained in the constant orientation between the lowered position and the raised position. A lifter assembly for moving the saddle member relative to the base member is coupled to and extends between the saddle member and one of the linkage and the base member. The lifter assembly is extendable to move the saddle member toward the raised position and retractable to move the saddle member toward the lowered position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
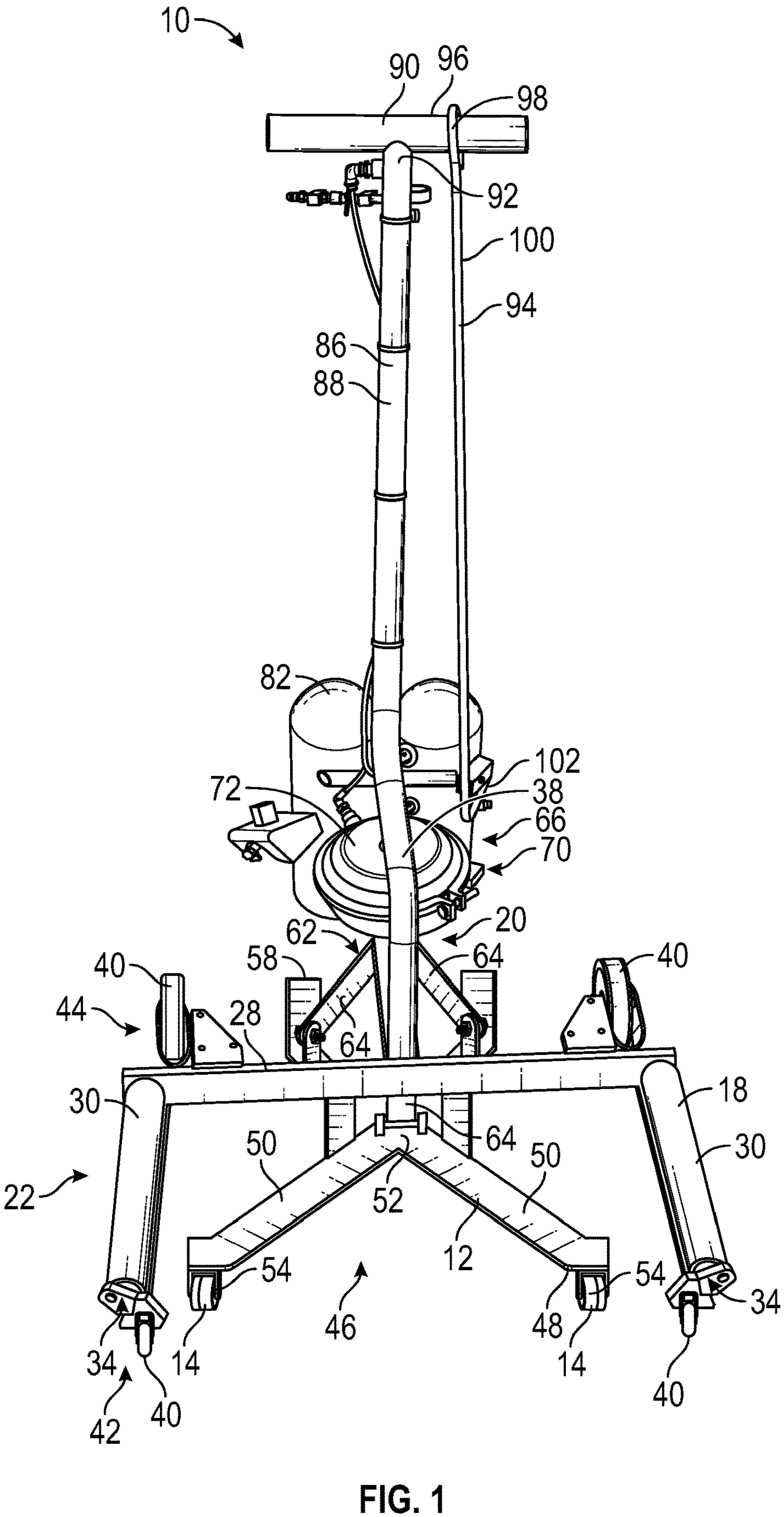
FIG. 1 is a perspective front view of a truck wheel lifting cart according to an embodiment of the disclosure.
Figure 2:
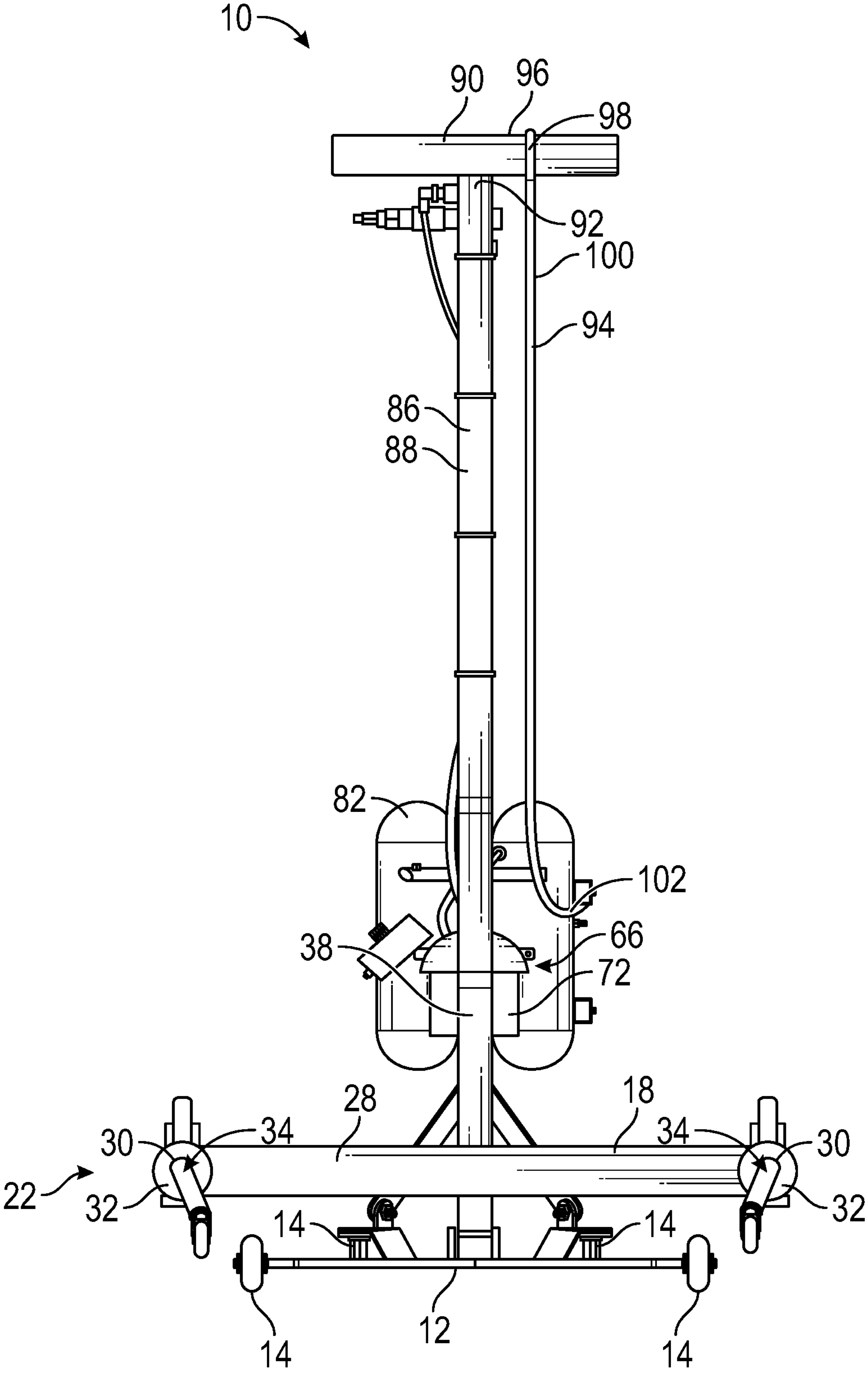
FIG. 2 is a front view of an embodiment of the disclosure.
Figure 3:
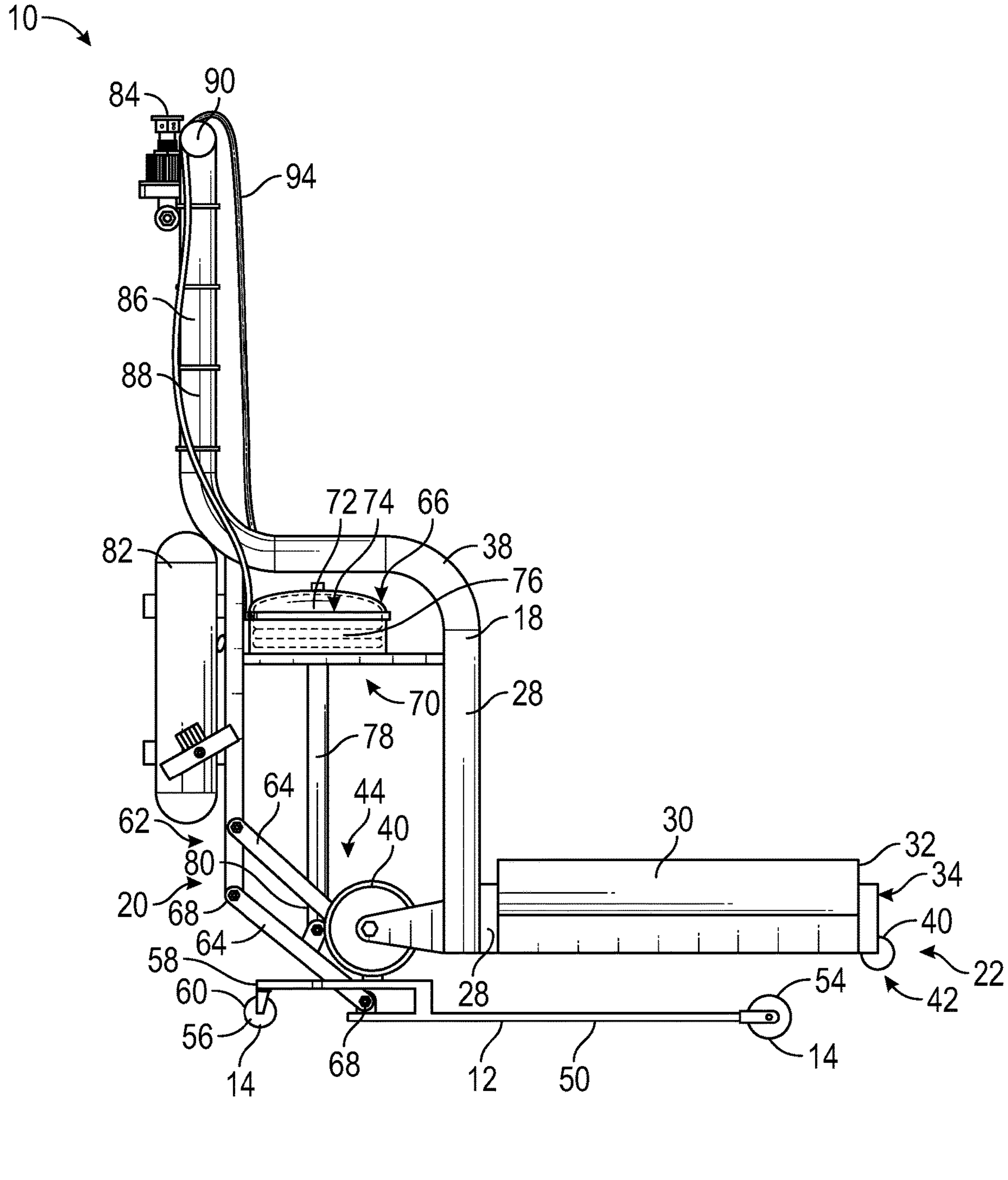
FIG. 3 is a side view of an embodiment of the disclosure.
Figure 4:
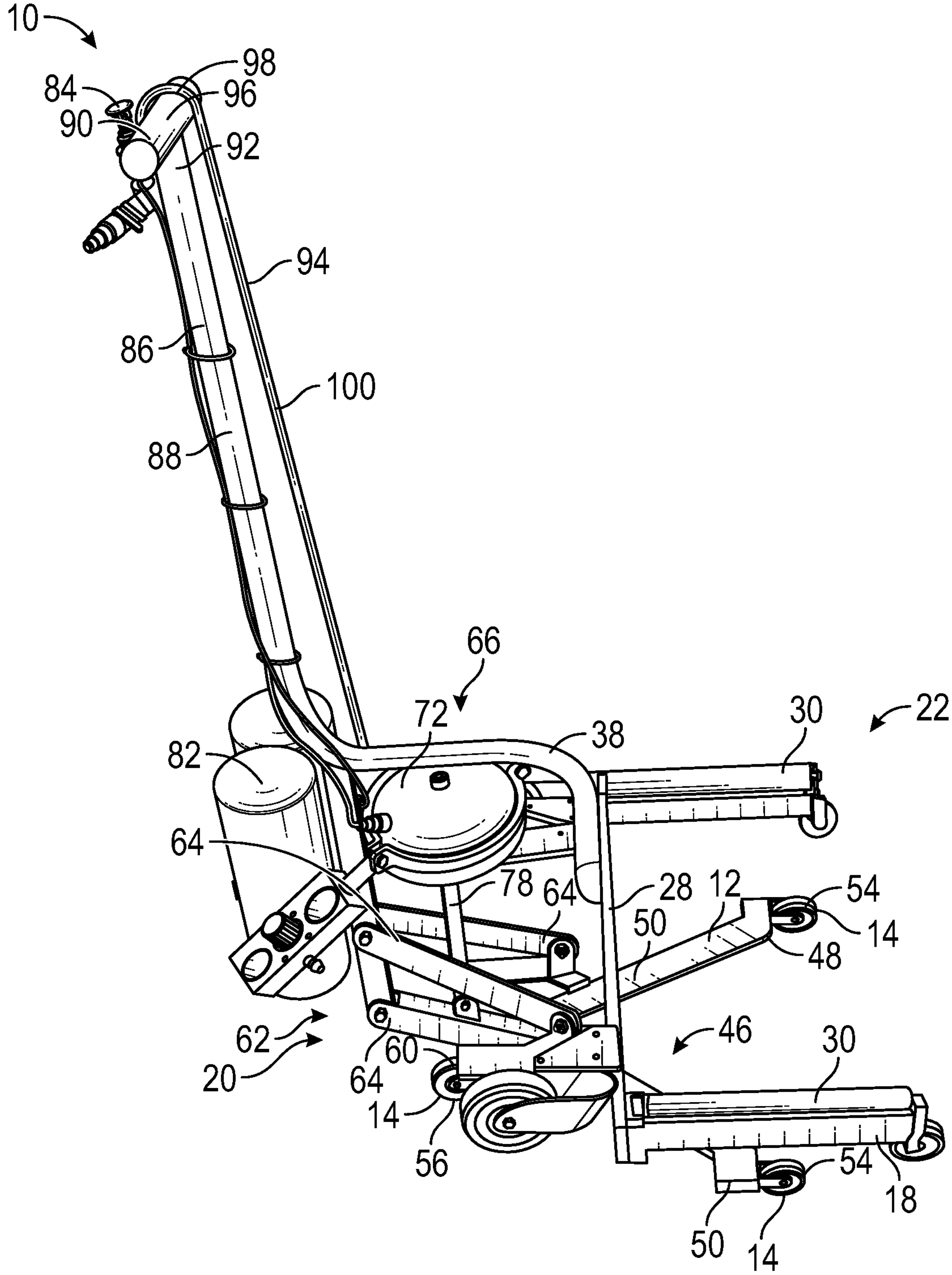
FIG. 4 is a perspective side view of an embodiment of the disclosure.
Figure 5:
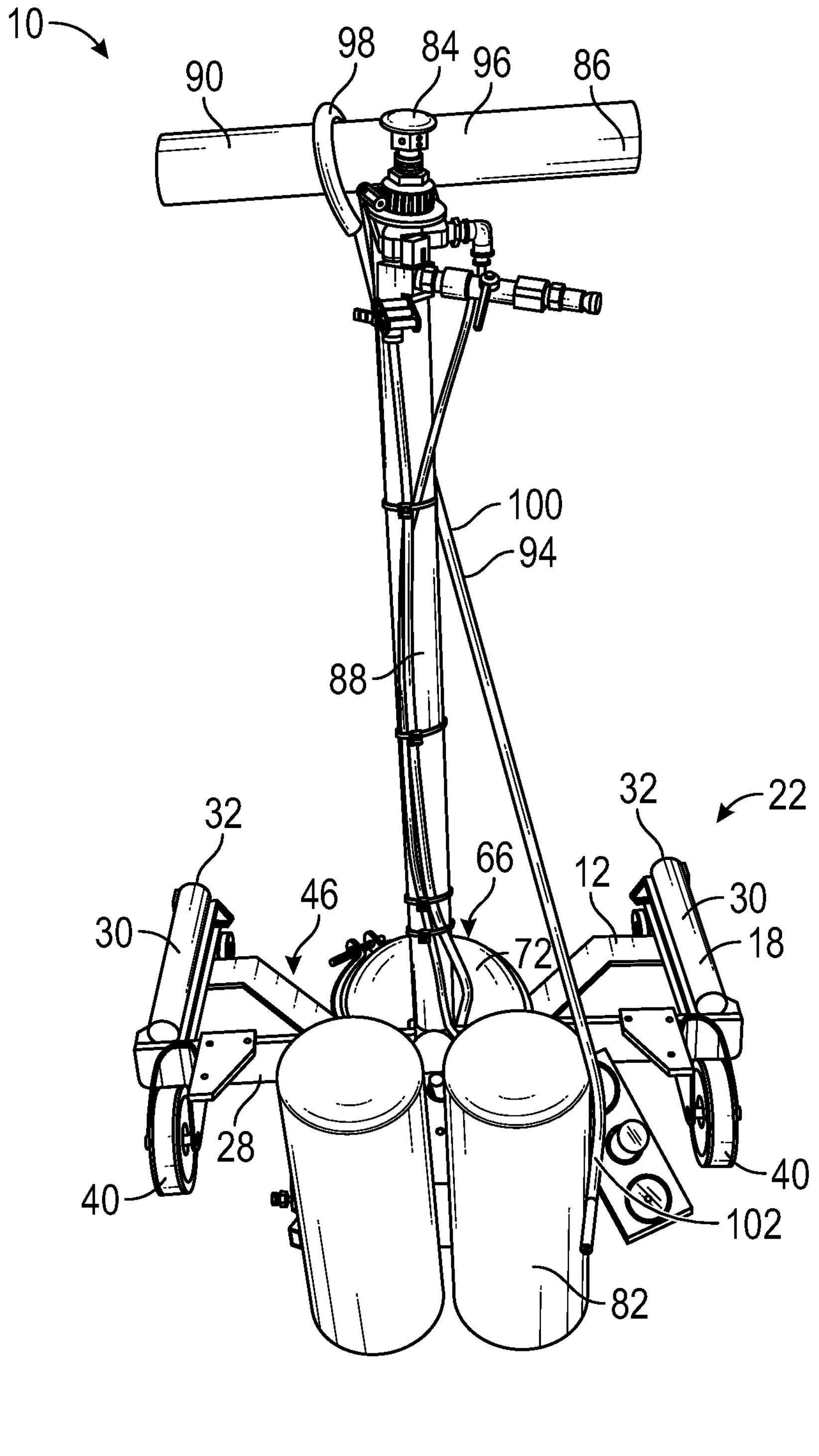
FIG. 5 is a perspective rear view of an embodiment of the disclosure.
Figure 6:
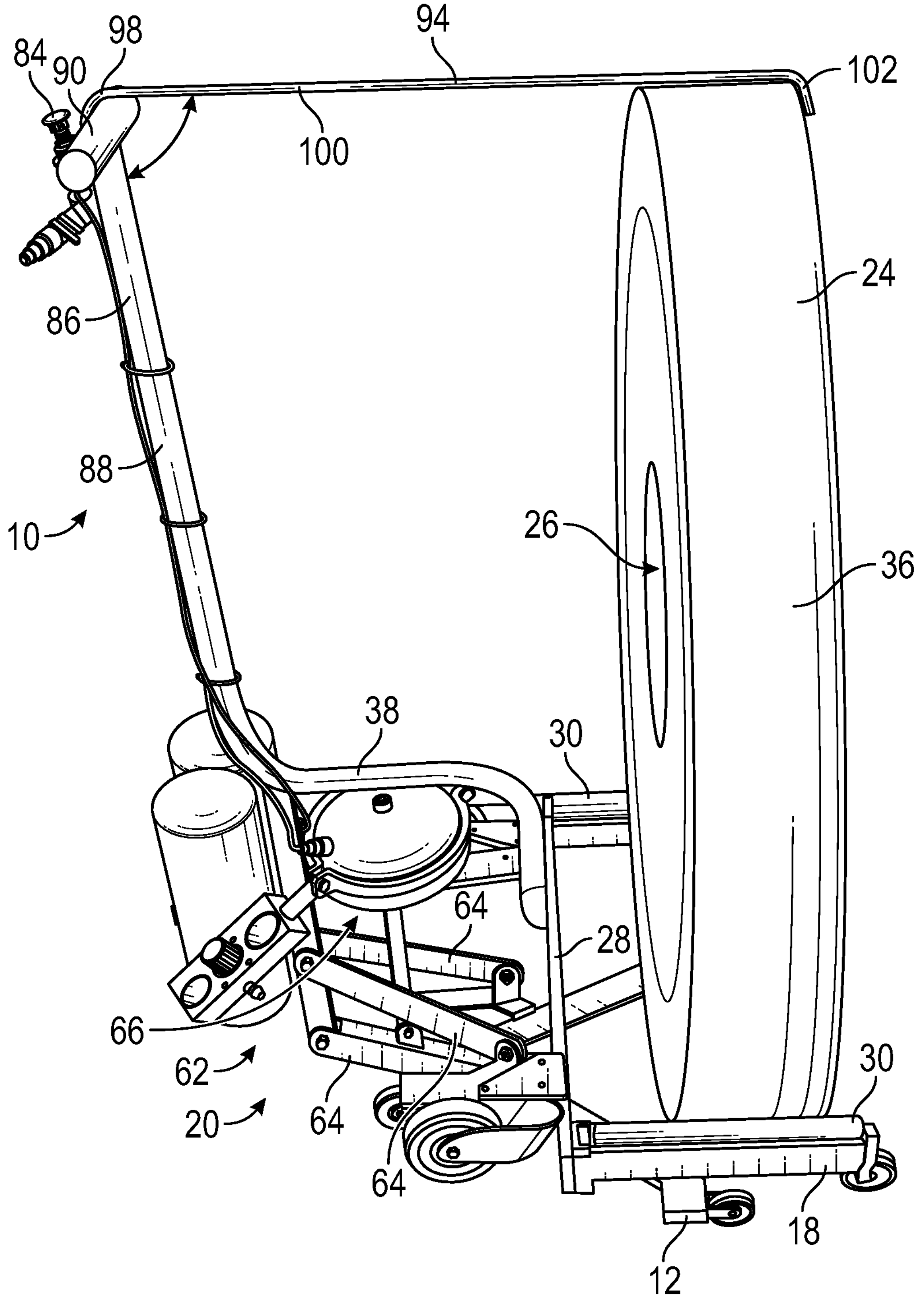
FIG. 6 is an in-use side view of an embodiment of the disclosure.

With reference now to the drawings, and in particular to FIGS. 1 through 6 thereof, a new truck wheel lifting cart embodying the principles and concepts of an embodiment of the disclosure and generally designated by the reference numeral 10 will be described.

As best illustrated in FIGS. 1 through 6, the truck wheel lifting cart 10 generally comprises a base member 12 with a plurality of base wheels 14 being coupled to and extending downwardly from the base member 12. The base wheels 14 are configured for positioning on a support surface and facilitating movement of the base member 12 across the support surface. A saddle member 18 is attached via a linkage 20 to the base member 12 such that the saddle member 18 is movable between a lowered position and a raised position 22 and the saddle member 18 is retained in a constant orientation relative to the base member 12 when being moved between the lowered position and the raised position 22. The saddle member 18 is configured to support a truck wheel 24 on the saddle member 18, align a central axis 26 of the truck wheel 24 in a horizontal orientation, and permit rotation of the truck wheel 24 about the central axis 26.

The saddle member 18 comprises a roller spacing member 28 extending laterally relative to the base member 12 and a pair of rollers 30 each being rotationally coupled to and extending forwardly from the roller spacing member 28, terminating in a free end 32. Each of the pair of rollers 30 is laterally spaced from each other. A rotational axis 34 of one of the pair of rollers 30 is also oriented parallel to a rotational axis 34 of another of the pair of rollers 30. The pair of rollers 30 is configured to support the truck wheel 24 on and between the pair of rollers 30. The pair of rollers 30 is further configured for engaging a radial surface 36 of the truck wheel 24, aligning the central axis 26 of the truck wheel 24 parallel to the rotational axis 34 of each of the pair of rollers 30, and permitting rotation of the truck wheel 24 about the central axis 26. The saddle member 18 also comprises an attachment member 38 for coupling the saddle member 18 to the base member 12 which is coupled to and extends rearwardly from the roller spacing member 28.

The saddle member 18 may also include a plurality of saddle wheels 40 being coupled to and extending downwardly from the saddle member 18. In such an embodiment, a first pair 42 of the plurality of saddle wheels 40 each is positioned adjacent to the free end 32 of one of each of the pair of rollers 30, and a second pair 44 of the plurality of saddle wheels 40 each is coupled to the roller spacing member 28 and is positioned adjacent to one of the pair of rollers 30.

The saddle member 18 is positioned adjacently above the base member 12 while in the lowered position and is movable upwardly and forwardly from the lowered position to the raised position 22. A recess 46 may be positioned in a front end 48 of the base member 12 to make room for the truck wheel 24 when the saddle member 18 supports the truck wheel 24 in the lowered position. The base member 12 may alternatively comprise a pair of beams 50 being coupled to each other which extend forwardly and divergently from a junction 52 of the pair of beams 50 to form a V-shape and define the recess 46 between the beams 50. In either embodiment, the plurality of base wheels 14 may include a pair of front wheels 54 being coupled to the front end 48 of the base member 12, each of the pair of front wheels 54 being positioned opposite each other across the recess 46. The plurality of base wheels 14 may also include a pair of rear wheels 56, each of which is positioned adjacent to a rear end 58 of the base member 12 and is a caster wheel 60 to facilitate steering of the base member 12.

The linkage 20 is coupled to and extends between the base member 12 and the attachment member 38 of the saddle member 18. The linkage 20 is a parallelogram four-bar mechanism 62 which comprises a plurality of pivoting arms 64 each being pivotably coupled to the base member 12 and the attachment member 38 such that the saddle member 18 is pivotably movable upwardly and forwardly with respect to the base member 12 while being retained in the constant orientation. A parallelogram four-bar mechanism 62 as known in the mechanical arts maintains two bodies in constant orientation relative to each other while one body pivots about the other body across a plane of motion by using at least a pair of links which are each pivotably coupled to each of the two bodies. The links may have varying geometries, but the orthogonal projection of each of the links onto the plane of motion have equal lengths and are parallel to each other. These limitations permit the pivoting motion of one body around the other while maintaining a constant orientation. The linkage 20 may alternatively comprise a gear train, a track, or the like to maintain the saddle member 18 in the constant orientation with respect to the base member 12 while moving between the lowered position and the raised position 22.

A lifter assembly 66 for moving the saddle member 18 relative to the base member 12 is coupled to and extends between the saddle member 18 and one of the plurality of pivoting arms 64 of the linkage 20. The lifter assembly 66 is pivotably coupled to the one of the plurality of pivoting arms 64 between a pair of ends 68 of the one of the plurality of pivoting arms 64. The lifter assembly 66 is extendable to urge the one of the pivoting arms 64 to pivot away from the saddle member 18 such that the saddle member 18 moves toward the raised position 22 and is retractable to urge the one of the plurality of pivoting arms 64 toward the saddle member 18 such that the saddle member 18 moves toward the lowered position. In some embodiments, the lifter assembly 66 comprises a pneumatic actuator 70, but may comprise a hydraulic actuator, a lead screw, a rack-and-pinion drive, or the like. The pneumatic actuator 70 comprises a casing 72 having a chamber 74 positioned therein which is coupled to the saddle member 18. A piston 76 is positioned within the chamber 74 and is vertically movable within the chamber 74. A rod 78 is coupled to and extends downwardly from the piston 76. The rod 78 extends outwardly of the chamber 74, and a distal end 80 of the rod 78 relative to the piston 76 is coupled to the one of the plurality of pivoting arms 64 of the linkage 20. An air tank 82 containing a quantity of compressed air is fluidically coupled to the chamber 74 and is attached to the attachment member 38 of the saddle member 18. A controller 84 is fluidically coupled to the air tank 82 and the chamber 74. The controller 84 selectively permits compressed air to move from the air tank 82 to the chamber 74 to urge the piston 76 downwardly to extend the lifter assembly 66 and upwardly to retract the lifter assembly 66.

A handle 86 includes an extension portion 88 which is coupled to and extends upwardly from the attachment member 38 of the saddle member 18. The handle 86 also includes a crossbar portion 90 which is coupled to a distal end 92 of the extension portion 88 relative to the saddle member 18 and extends in opposite lateral directions 15 from the extension portion 88. The controller 84 of the pneumatic actuator 70 may be coupled to the crossbar portion 90. A retainer 94 is pivotably coupled to a distal end 96 of the handle 86 and is configured to releasably engage the truck wheel 24 when the truck wheel 24 is positioned on the saddle member 18 to retain the truck wheel 24 on the saddle member 18. The retainer 94 comprises an arcuate portion 98 extending around the crossbar portion 90 of the handle 86, an elongated rod portion 100 being coupled to and extending away from the arcuate portion 98, and a hook portion 102 being coupled to and extending laterally from the elongated rod portion 100 opposite the arcuate portion 98. The hook portion 102 is configured to be positionable to engage the truck wheel 24 to retain the truck wheel 24 on the saddle member 18.

In use, the truck wheel lifting cart 10 is moved across the support surface so that the rollers 30 are positioned below and on opposing sides of the truck wheel 24. The lifter assembly 66 is activated to lift the saddle member 18 such that the rollers 30 engage the truck wheel 24. The hook of the retainer 94 may be positioned to engage the truck wheel

24 to retain the truck wheel 24 on the saddle member 18. The truck wheel lifting cart 10 may be moved while supporting the truck wheel 24, and the truck wheel 24 may be rotated on the rollers 30. The saddle member 18 may also be lowered to the lowered position by actuating the controller 84 to activate the pneumatic actuator 70 to lower the saddle member 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A truck wheel lifting cart apparatus comprising:

a base member;

a plurality of base wheels being coupled to and extending downwardly from the base member, the plurality of wheels being configured for positioning on a support surface and facilitating movement of the base member across the support surface;

a saddle member being attached to the base member such that the saddle member is movable between a lowered position and a raised position, the saddle member being retained in a constant orientation relative to the base member when the saddle member is moved between the lowered position and the raised position, the saddle member being positioned adjacently above the base member when in the lowered position, the saddle member being moved upwardly from the base member when the saddle member is moved from the lowered position toward the raised position, the saddle member being configured for supporting a truck wheel thereon, aligning a central axis of the truck wheel in a horizontal orientation, and permitting rotation of the truck wheel about the central axis, the saddle member comprising:

a roller spacing member extending laterally relative to the base member;

a pair of rollers each being rotationally coupled to and extending forwardly from the roller spacing member, the pair of rollers being laterally spaced from each other, each of the pair of rollers terminating in a free end, a rotational axis of one of the pair of rollers being oriented parallel to a rotational axis of another of the pair of rollers, the pair of rollers being configured to support the truck wheel thereon and therebetween, the pair of rollers being configured for engaging a radial surface of the truck wheel, aligning the central axis of the truck wheel parallel to the rotational axis of each of the pair of rollers, and permitting rotation of the truck wheel about the central axis; and a plurality of saddle wheels being coupled to and extending downwardly from the saddle member, a first pair of the plurality of saddle wheels each being positioned adjacent to the free end of one of each of the pair of rollers, a second pair of the plurality of saddle wheels each being coupled to the roller spacing member and being positioned adjacent to one of the pair of rollers;

a linkage being coupled to and extending between the base member and the saddle member, the linkage permitting the saddle member to move upwardly and forwardly of the base member when the saddle member is moved from the lowered position to the raised position such that the saddle member is retained in the constant orientation between the lowered position and the raised position; and a lifter assembly for moving the saddle member relative to the base member being coupled to and extending between the saddle member and one of the linkage and the base member, the lifter assembly being extendable to move the saddle member toward the raised position and retractable to move the saddle member toward the lowered position.

2. The truck wheel lifting cart apparatus of claim 1, further comprising the base member having a recess in a front end of the base member.

3. The truck wheel lifting cart apparatus of claim 2, further comprising the plurality of base wheels including a pair of front wheels being coupled to the front end of the base member, each of the pair of front wheels being positioned opposite each other across the recess, the plurality of base wheels including a pair of rear wheels being positioned adjacent to a rear end of the base member, each of the pair of rear wheels being a caster wheel.

4. The truck wheel lifting cart apparatus of claim 1, further comprising the linkage being a parallelogram four-bar mechanism, the parallelogram four-bar mechanism comprising a plurality of pivoting arms each being pivotably coupled to the base member and an attachment member of the saddle member such that the saddle member is pivotably movable upwardly and forwardly with respect to the base member while being retained in the constant orientation.

5. A truck wheel lifting cart apparatus comprising:

a base member;

a plurality of base wheels being coupled to and extending downwardly from the base member, the plurality of wheels being configured for positioning on a support surface and facilitating movement of the base member across the support surface;

a saddle member being attached to the base member such that the saddle member is movable between a lowered position and a raised position, the saddle member being retained in a constant orientation relative to the base member when the saddle member is moved between the lowered position and the raised position, the saddle member being positioned adjacently above the base member when in the lowered position, the saddle member being moved upwardly from the base member when the saddle member is moved from the lowered position toward the raised position, the saddle member being configured for supporting a truck wheel thereon, aligning a central axis of the truck wheel in a horizontal orientation, and permitting rotation of the truck wheel about the central axis;

a linkage being coupled to and extending between the base member and the saddle member, the linkage permitting the saddle member to move upwardly and forwardly of the base member when the saddle member is moved from the lowered position to the raised position such that the saddle member is retained in the constant orientation between the lowered position and the raised position; and a lifter assembly for moving the saddle member relative to the base member being coupled to and extending between the saddle member and one of the linkage and the base member, the lifter assembly being extendable to move the saddle member toward the raised position and retractable to move the saddle member toward the lowered position, the lifter assembly comprising a pneumatic actuator, the pneumatic actuator comprising:

a casing having a chamber positioned therein, the casing being coupled to the saddle member;

a piston being positioned within the chamber and being vertically movable within the chamber;

a rod being coupled to and extending downwardly from the piston, the rod extending outwardly of the chamber, a distal end of the rod relative to the piston being coupled to the one of the plurality of pivoting arms of the linkage;

an air tank containing a quantity of compressed air and being fluidically coupled to the chamber; and a controller being fluidically coupled to the air tank and the chamber, the controller selectively permitting compressed air to move from the air tank to the chamber to urge the piston downwardly to extend the lifter assembly and upwardly to retract the lifter assembly.

6. A truck wheel lifting cart apparatus comprising:

a base member;

a plurality of base wheels being coupled to and extending downwardly from the base member, the plurality of wheels being configured for positioning on a support surface and facilitating movement of the base member across the support surface;

a saddle member being attached to the base member such that the saddle member is movable between a lowered position and a raised position, the saddle member being retained in a constant orientation relative to the base member when the saddle member is moved between the lowered position and the raised position, the saddle member being positioned adjacently above the base member when in the lowered position, the saddle member being moved upwardly from the base member when the saddle member is moved from the lowered position toward the raised position, the saddle member being configured for supporting a truck wheel thereon, aligning a central axis of the truck wheel in a horizontal orientation, and permitting rotation of the truck wheel about the central axis;

a linkage being coupled to and extending between the base member and the saddle member, the linkage permitting the saddle member to move upwardly and forwardly of the base member when the saddle member is moved from the lowered position to the raised position such that the saddle member is retained in the constant orientation between the lowered position and the raised position;

a lifter assembly for moving the saddle member relative to the base member being coupled to and extending between the saddle member and one of the linkage and the base member, the lifter assembly being extendable to move the saddle member toward the raised position and retractable to move the saddle member toward the lowered position;

a handle being coupled to and extending upwardly from the saddle member; and a retainer being pivotably coupled to the handle, the retainer comprising a hook portion being configured to be positionable to engage the truck wheel to retain the truck wheel on the saddle member when the truck wheel is positioned on the saddle member.

7. The truck wheel lifting cart apparatus of claim 6, further comprising:

the handle including an extension portion being coupled to and extending upwardly from the saddle member, the handle including a crossbar portion being coupled to a distal end of the extension portion relative to the saddle member and extending in opposite lateral directions from the extension portion; and the retainer further comprising an arcuate portion extending around the crossbar portion of the handle and an elongated rod portion being coupled to and extending away from the arcuate portion, the hook portion being coupled to and extending laterally from the elongated rod portion opposite the arcuate portion.

8. The truck wheel lifting cart apparatus of claim 6, further comprising:

the base member having a recess in a front end of the base member;

the plurality of base wheels including a pair of front wheels being coupled to the front end of the base member, each of the pair of front wheels being positioned opposite each other across the recess, the plurality of base wheels including a pair of rear wheels being positioned adjacent to a rear end of the base member, each of the pair of rear wheels being a caster wheel;

the saddle member comprising:

a roller spacing member extending laterally relative to the base member;

a pair of rollers each being rotationally coupled to and extending forwardly from the roller spacing member, the pair of rollers being laterally spaced from each other, each of the pair of rollers terminating in a free end, a rotational axis of one of the pair of rollers being oriented parallel to a rotational axis of another of the pair of rollers, the pair of rollers being configured to support the truck wheel thereon and therebetween, the pair of rollers being configured for engaging a radial surface of the truck wheel, aligning the central axis of the truck wheel parallel to the rotational axis of each of the pair of rollers, and permitting rotation of the truck wheel about the central axis;

an attachment member for coupling the saddle member to the base member, the attachment member being coupled to and extending rearwardly from the roller spacing member; and a plurality of saddle wheels being coupled to and extending downwardly from the saddle member, a first pair of the plurality of saddle wheels each being positioned adjacent to the free end of one of each of the pair of rollers, a second pair of the plurality of saddle wheels each being coupled to the roller spacing member and being positioned adjacent to one of the pair of rollers;

the linkage being a parallelogram four-bar mechanism, the parallelogram four-bar mechanism comprising a plurality of pivoting arms each being pivotably coupled to the base member and the attachment member of the saddle member such that the saddle member is pivotably movable upwardly and forwardly with respect to the base member;

the lifter assembly being coupled to and extending between the saddle member and one of the plurality of pivoting arms of the linkage, the lifter assembly being extendable to urge the one of the pivoting arms to pivot away from the saddle member such that the saddle member moves toward the raised position, the lifter assembly being retractable to urge the one of the plurality of pivoting arms toward the saddle member such that the saddle member moves toward the lowered position, the lifter assembly comprising a pneumatic actuator, the pneumatic actuator comprising:

a casing having a chamber positioned therein, the casing being coupled to the saddle member;

a piston being positioned within the chamber and being vertically movable within the chamber;

a rod being coupled to and extending downwardly from the piston, the rod extending outwardly of the chamber, a distal end of the rod relative to the piston being coupled to the one of the plurality of pivoting arms of the linkage;

an air tank containing a quantity of compressed air and being fluidically coupled to the chamber, the air tank being attached to the attachment member of the saddle member; and a controller being fluidically coupled to the air tank and the chamber, the controller selectively permitting compressed air to move from the air tank to the chamber to urge the piston downwardly to extend the lifter assembly and upwardly to retract the lifter assembly;

the handle including an extension portion being coupled to and extending upwardly from the saddle member, the handle including a crossbar portion being coupled to a distal end of the extension portion relative to the saddle member and extending in opposite lateral directions from the extension portion, the handle being coupled to the attachment member of the saddle member, the controller being coupled to the crossbar portion; and the retainer further comprising an arcuate portion extending around the crossbar portion of the handle, an elongated rod portion being coupled to and extending away from the arcuate portion, and a hook portion being coupled to and extending laterally from the elongated rod portion opposite the arcuate portion.

* * * * *